Sept. 11, 1951      J. E. WOOD      2,567,901
STEERING WHEEL SPINNER
Filed July 14, 1950

INVENTOR.
James E. Wood

Patented Sept. 11, 1951

2,567,901

UNITED STATES PATENT OFFICE 2,567,901

STEERING WHEEL SPINNER

James E. Wood, Evanston, Ill., assignor to Santay Corporation, Chicago, Ill., a corporation of Illinois Application July 14, 1950, Serial No. 173,724

7 Claims. (Cl. 74—557)

This invention relates to steering wheel spinners and particularly to the construction of spinner knobs for easy assembly.

Spinners are usually constructed with a post carrying clamping means for attaching it to the rim of a steering wheel. A knob is rotatably mounted on the post and usually comprises a hollow body and a cap cemented on the body. One construction of this general type is disclosed in the patent to Deer No. 2,441,061.

The present invention has for its principal object the simplification of the spinner body construction and assembly and the provision of a knob of smooth contour and pleasing appearance.

Another object is to provide a spinner in which the parts are mechanically interlocked so that no cementing is necessary. With this construction the spinners can be assembled rapidly with a minimum of labor and will be held securely assembled.

The above and other objects and advantages of the invention will be more readily apparent from the following description when read in connection with the accompanying drawing, in which.

Figure 1:
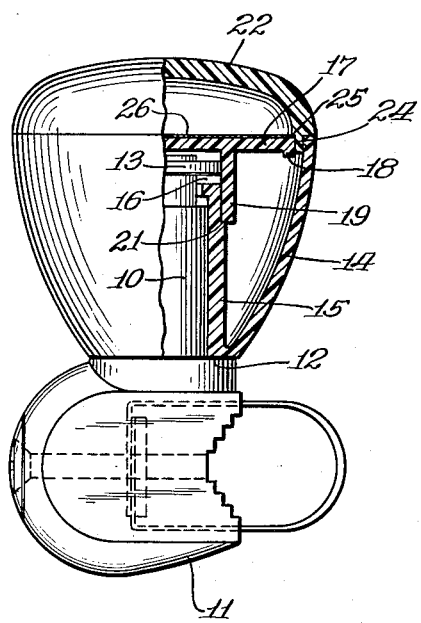
Figure 1 is a side elevation with parts in section of a spinner embodying the invention.
Figures 2, 3:
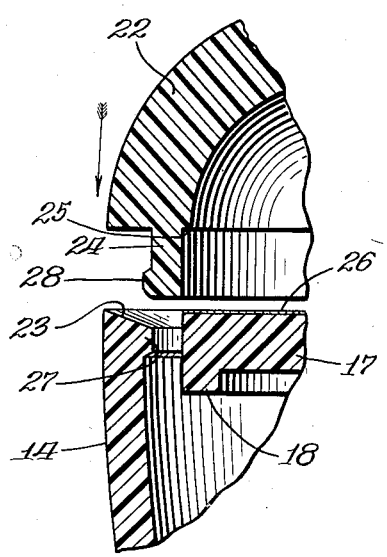
Figure 2 is an enlarged partial section showing the parts disassembled.
Figure 3 is a view similar to Figure 2 showing the parts assembled.

The spinner as shown comprises a post 10 supported on a clamp mechanism 11 formed for attachment to the rim of a steering wheel or the like. Any desired clamp mechanism may be employed and since that shown forms no part of the present invention it will not be described in more detail herein. The post joins the clamp at an enlarged shoulder 12 and is reduced and slotted at its upper end to receive a C washer 13.

A spinner or knob body 14 preferably formed of relatively thin plastic is provided with an internal tubular hub 15 to fit rotatably over the post 10. The body 14 is of generally conical shape with its enlarged open end toward the top and with its smaller end resting on the shoulder 12. Preferably a spring washer 16 lies between the end of the hub 15 and the C washer to produce a light friction between the body and the shoulder 12 so that the body will not spin with an undesired degree of freedom.

A flat disc member 17 fits in the enlarged open end of the body and is of a smaller diameter than the body to leave an annular space. Preferably the edge of the disc member has an annular reinforcing flange 18. A sleeve 19 is formed integrally with the disc member and projects downward therefrom to fit over the upper part of the hub 15. Preferably the hub is formed with an external stop shoulder 21 engaging the end of the sleeve to limit movement of the sleeve so that the upper surface of the disc 17 lies substantially in the plane of the open end of the body. The sleeve 19 will also hold the C washer 13 against displacement as disclosed in said Deer Patent No. 2,441,061.

The body is closed by a dished cap 22 also preferably formed of relatively thin plastic of a size and shape to fit closely over the top of the body and to form a smooth continuation thereof. To insure a smooth outer surface, the outer end of the body may be beveled as indicated at 23. The cap is formed with an annular end flange 24 to fit between the edge of the disc 17 and the outer end of the body to locate and secure the cap. It is also formed with an internal shoulder 25 to fit against the top surface of disc 17 and hold it in position. If desired when a transparent cap is employed, a decorative sheet 26 carrying an ornamental picture or the like may be placed over the disc 17 and held in place by the shoulder 25.

To secure the knob parts together, the body is formed at its open end with an inwardly projecting annular flange or shoulder 27 and the flange 24 is formed with an outwardly projecting flange or shoulder 28. When the parts are assembled by pressing the flange 24 into the body, the body will yield sufficiently to let the shoulders pass each other. With the cap fully pressed in the shoulders will interlock to hold the cap securely on the body. The disc 17 will reinforce the flange 24 against cold flow or deflection so that the parts are held securely and permanently assembled.

With this construction no cementing is necessary and the entire assembly can be completed simply by pressing the parts together. This greatly facilitates the assembly operation and removes any necessity of wiping off excess or spilled cement. The several knob parts may be colored as desired and internally silvered to produce a variety of pleasing designs.

While one embodiment of the invention has been shown and described in detail it will be understood that this is illustrative only and is not to be taken as a definition of the scope of the invention, reference being had for this purpose to the appended claims.

What is claimed is:

1. A spinner for steering wheels comprising a post adapted to be secured to the rim of a wheel and to project therefrom, a hollow spinner body formed with a central hub to fit rotatably over the post, a fastener on the post to hold the spinner body thereon, a flat disc member fitting in the open end of the body and of smaller diameter than the open end of the body, and a cap having an annular reduced flange fitting between the disc and the open end of the body.

2. A spinner for steering wheels comprising a post adapted to be secured to the rim of a wheel and to project therefrom, a hollow spinner body formed with a central hub to fit rotatably over the post, a fastener on the post to hold the spinner body thereon, a flat disc member fitting in the open end of the body and of smaller diameter than the open end of the body, a cap having an annular reduced flange fitting between the disc and the open end of the body, an inwardly extending shoulder at the open end of the body, and an outwardly extending shoulder on the flange to interlock with the inwardly extending shoulder.

3. A spinner for steering wheels comprising a post adapted to be secured to the rim of a wheel and to project therefrom, a hollow spinner body formed with a central hub to fit rotatably over the post, a fastener on the post to hold the spinner body thereon, a flat disc member fitting in the open end of the body and of smaller diameter than the open end of the body, a central tubular extension on the disc member fitting over the hub and post, and a cap having an annular reduced flange fitting between the disc and the open end of the body.

4. A spinner for steering wheels comprising a post adapted to be secured to the rim of a wheel and to project therefrom, a hollow spinner body formed with a central hub to fit rotatably over the post, a fastener on the post to hold the spinner body thereon, a flat disc member fitting in the open end of the body and of smaller diameter than the open end of the body, a central tubular extension on the disc member fitting over the hub and post, a cap having an annular reduced flange fitting between the disc and the open end of the body, an inwardly extending shoulder at the open end of the body, and an outwardly extending shoulder on the flange to interlock with the inwardly extending shoulder.

5. A spinner for steering wheels comprising a post adapted to be secured to the rim of a wheel and to project therefrom, a hollow spinner body formed with an internal tubular hub to fit rotatably over the post, a fastener on the post engaging the end of the tubular hub to hold the body on the post, a disc member fitting in the open end of the body and of smaller diameter than the open end of the body, a central tubular sleeve on the disc member fitting over the tubular hub, a cap having an annular reduced flange fitting between the disc and the open end of the body, and an internal shoulder in the cap to engage the upper surface of and position the disc member.

6. A spinner for steering wheels comprising a post adapted to be secured to the rim of a wheel and to project therefrom, a hollow spinner body formed with an internal tubular hub to fit rotatably over the post, a fastener on the post engaging the end of the tubular hub to hold the body on the post, a disc member fitting in the open end of the body and of smaller diameter than the open end of the body, a central tubular sleeve on the disc member fitting over the tubular hub, the hub having a stop shoulder thereon engaging the end of the sleeve to limit axial movement thereof, and a cap having an annular reduced flange fitting between the disc and the end of the body.

7. A spinner for steering wheels comprising a post adapted to be secured to the rim of a wheel and to project therefrom, a hollow spinner body formed with an internal tubular hub to fit rotatably over the post, a fastener on the post engaging the end of the tubular hub to hold the body on the post, a disc member fitting in the open end of the body and of smaller diameter than the open end of the body, a central tubular sleeve on the disc member fitting over the tubular hub, the hub having a stop shoulder thereon engaging the end of the sleeve to limit axial movement thereof, a cap having an annular reduced flange fitting between the disc and the end of the body, an internal shoulder in the cap to engage the upper surface of the disc member, an inwardly extending shoulder at the open end of the body, and an outwardly extending shoulder on the flange interlocking with the inwardly extending shoulder.

JAMES E. WOOD.

No references cited.